(12) United States Patent
Boyce et al.

(10) Patent No.: US 6,459,986 B1
(45) Date of Patent: Oct. 1, 2002

(54) ROUTING SYSTEM

(75) Inventors: Conor Boyce, Southampton; James Spencer Smith, Sleaford, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/191,014

(22) Filed: Nov. 12, 1998

(30) Foreign Application Priority Data

Sep. 18, 1998 (GB) ................................ 9820260

(51) Int. Cl.[7] ................ G01C 21/00; G06G 7/78; G06F 17/00
(52) U.S. Cl. .............. 701/202; 701/201; 701/205; 701/208; 705/13; 705/5; 705/6
(58) Field of Search ................... 701/201, 202, 701/204, 206, 208, 209; 705/5, 6, 13, 417, 418

(56) References Cited

U.S. PATENT DOCUMENTS

| | | | | |
|---|---|---|---|---|
| 4,360,875 A | * | 11/1982 | Behnke | 455/456 |
| 5,122,959 A | * | 6/1992 | Nathanson et al. | 701/117 |
| 5,475,598 A | * | 12/1995 | Fushimi et al. | 701/202 |
| 5,506,779 A | * | 4/1996 | Kanki | 701/209 |
| 5,541,845 A | * | 7/1996 | Klein | 701/207 |
| 5,604,676 A | * | 2/1997 | Penzias | 705/417 |
| 5,715,163 A | * | 2/1998 | Bang et al. | 701/202 |
| 5,835,716 A | * | 11/1998 | Hunt et al. | 395/200.43 |
| 5,953,706 A | * | 9/1999 | Patel | 705/6 |
| 6,009,403 A | * | 12/1999 | Sato | 705/6 |
| 6,026,384 A | * | 2/2000 | Poppen | 705/400 |

* cited by examiner

Primary Examiner—Jacques H. Louis-Jacques
Assistant Examiner—Brian J. Broadhead
(74) Attorney, Agent, or Firm—Edward H. Duffield

(57) ABSTRACT

A routing system comprising one or more maps; route defining means instantiable to respond to driver interaction with a map to define a proposed pooling route and to store said pooling route; request defining means instantiable to respond to passenger interaction to define a request for a pooling route; search means instantiable to search stored pooling routes for one or more pooling routes suitable for said request; and addition means responsive to passenger selection of a suitable pooling route to include a passenger on said route.

17 Claims, 7 Drawing Sheets

FIG. 3

File Edit View Go Bookmarks Links Options Directory Window Help

Locator: http://www.car-pool.com/driver/form.html

Enter route details

| Start Date |
|---|
| Start Time |
| Frequency |

| Car Model |
|---|
| Registration |
| Colour |
| Max Spaces |
| E-mail |

Finished Route

ROUTING SYSTEM

FIELD OF THE INVENTION

The present invention relates to a graphic user interface client-server routing system and a method of operating a routing system.

BACKGROUND OF THE INVENTION

As rates of personal car ownership increase, road congestion is becoming a greater problem. One solution to combat the problem is car-pooling. It is known to operate server based car pooling systems within large organizations, where a driver stores his route information, including start and destination location as well as time of departure, on a server and potential passengers can then scan for suitable drivers. There are already a number of organizations running private or non-profit car-pooling systems on the Internet. These all operate through a similar text based user interface where drivers specify their start and end locations through which a passenger must either search manually or for whom the car-pool organization searches.

Such systems, however, are not very scalable and it may be difficult for a potential passenger to pick drivers that may in fact be suitable. This is because a driver may input, for example, London and Glasgow as start and end destinations, whereas a passenger travelling from Birmingham to Manchester, may not realize that their journey is a subset of that specified by the driver or, even if they do, it may be too difficult for a passenger to scan all such possibilities for a suitable start time.

Numerous U.S. Patents describe map based routing systems or client-server car-sharing systems including U.S. Pat. No. 4,360,875; U.S. Pat. No. 5,272,638; U.S. Pat. No. 5,604,676 and U.S. Pat. No. 5,758,313. None, however, disclose a system including all of the advantages of the present invention.

DISCLOSURE OF THE INVENTION

Accordingly, the present invention provides a routing system comprising: one or more maps; route defining means instantable to respond to driver interaction with a map to define a proposed pooling route and to store said pooling route; request defining means instantable to respond to passenger interaction to define a request for a pooling route; search means instantable to search stored pooling routes for one or more pooling routes suitable for said request; and addition means responsive to passenger selection of a suitable pooling route to include a passenger on said route.

It will be appreciated that in the present description the term "driver" is used for someone providing information about a proposed route, it may not necessarily be the party actually driving the vehicle, but as far as a passenger is concerned this person may as well be the driver. Similarly, the term "passenger" is used for someone requesting information about a proposed route, and need not be the actual person travelling.

BRIEF DESCRIPTION OF THE DRAWINGS

An embodiment of the invention will now be described with reference to the accompanying drawings, in which:

FIGS. 1 to 5 show Navigator pages generated by a car-pooling system according to a preferred embodiment of the invention;

DESCRIPTION OF THE PREFERRED EMBODIMENTS

In the preferred embodiment of the invention, both potential car-pool drivers and passengers connect to a car pool web server from a client computer running a web browser. The server may be within a local network, an intranet or visible across the Internet.

The server includes a home page which needs to interact with a driver or passenger to ascertain the details of the route they are to travel. In the present embodiment, this is done by presenting the driver or passenger with a map, FIG. 1. For a company operating from one site, only one map may be required, whereas for a large organization, a database of maps may need to be searched to find the map of interest. Searching for a suitable map displayed at a suitable scale is well known and many organizations, for example, Mapquest, provides web sites with such facilities.

Figure 2:
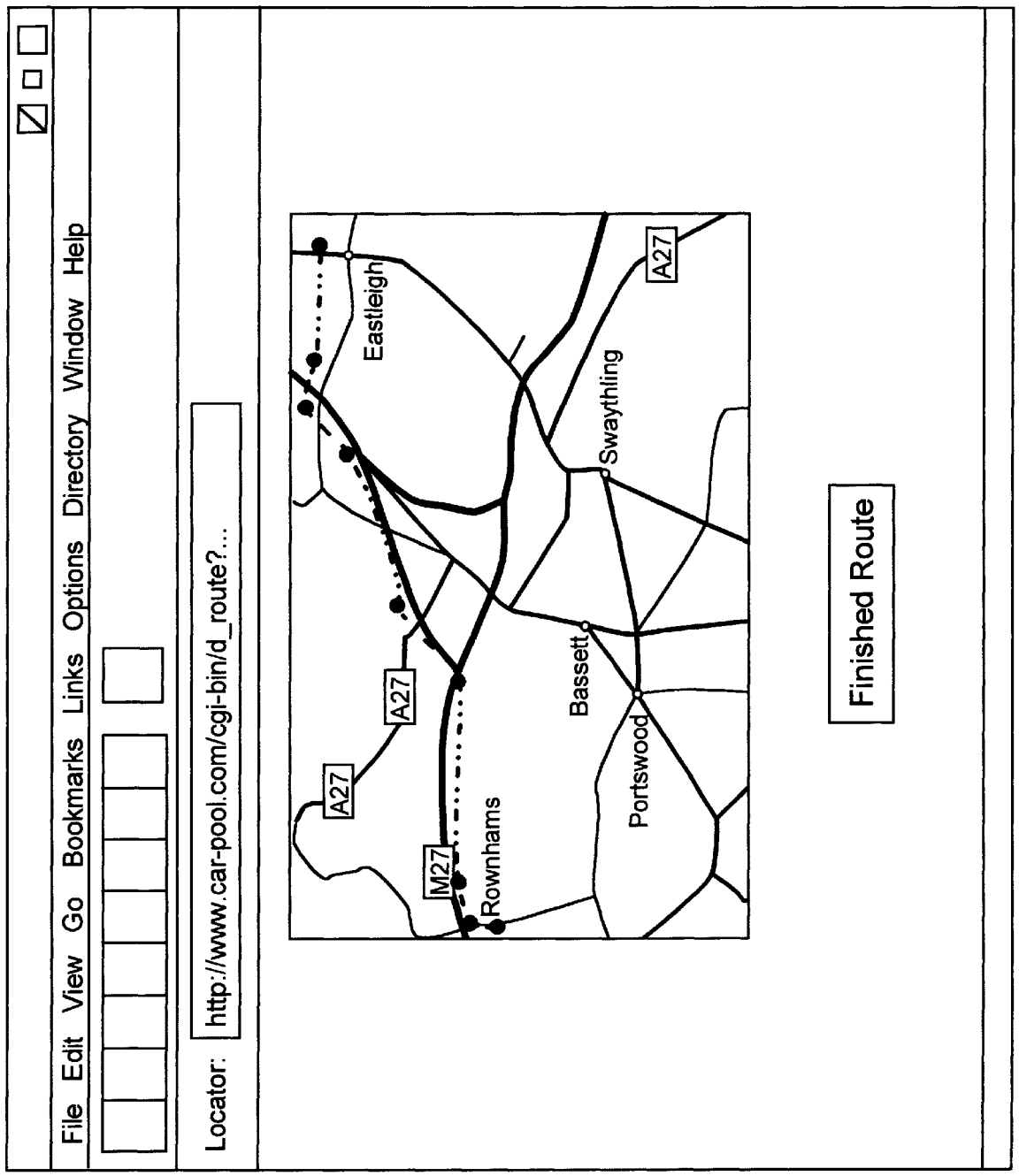

In any case, once a driver obtains a required map, by selecting the driver option, the driver can begin to draw the route they plan to travel, FIG. 2. It should be seen that because HTTP is a stateless environment and that a series of interactions are required between a driver and the server, a session_ID is preferably allocated to the driver at this point. This session_ID is included in each subsequent URL connecting the driver with the server, so that the server can keep track of the interaction. Use of a session_ID is well known and is disclosed in U.S. Pat. No. 5,708,780, Open Market Inc, and in "HTML & CGI Unleashed" by John December and Mark Ginsburg ISBN 0-672-30745-6, July, 1995.

Figure 6:
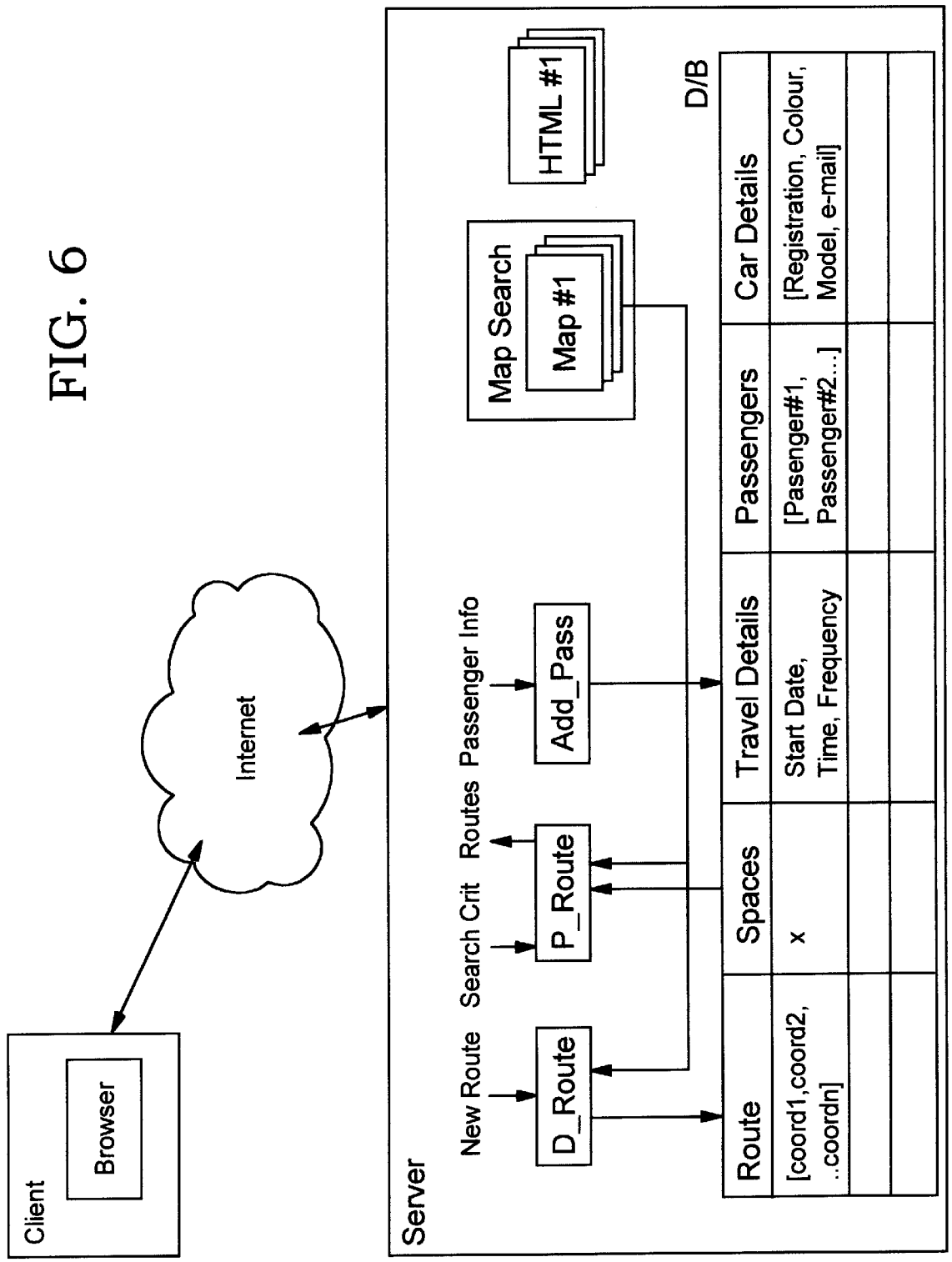
FIG. 6 shows a car-pooling system according to a preferred embodiment of the invention.

Preferably, the driver clicks on a series of locations on the map to outline a route. Each time the driver clicks on a location, a URL is generated including the map coordinate. Preferably, the URL is written in CGI format, for example:

http://www.car-pool.com/cgi-bin/d_route?x_coord&y_coord&session_ID where x_coord and y_coord are the coordinates clicked on by the driver and d_route is a program resident on the web server for adding driver routes to the car-pool database, FIG. 6.

When the server receives the URL including the first pair of coordinates for a session_ID, it stores the coordinates in a route attribute in a car-pool object, then returns the map and superimposes a dot marking the first location on the route. When the user clicks on the next location a URL of the same form to the one above is generated, d_route stores the next coordinate in the above object in the car-pool database, and returns a map on which two dots marking the selected locations are linked by a line superimposed on the map, FIG. 2.

It will be seen that in a system where maps can be displayed across many areas and at different scales, it may prove easier to search the database later if coordinates are stored in the database in world-coordinates rather than as coordinates within a specific map.

The driver preferably indicates the route is complete by clicking on a suitable screen control, in this case a "Finished Route" button, which in-turn notifies the server. In the preferred embodiment, the server responds by supplying an on-line form which the driver can now fill-in, FIG. 3. The form includes fields including the number of pool spaces available; travel details including start time, start date and journey frequency, for example, once, daily, weekly, weekdays; car details such as model, color and registration; and an e-mail address so that the driver can be contacted later. Other fields could also be provided so that drivers may also give estimated travel time to help the server calculate the estimated position of the car on the route at any given time. This information is again saved in the car-pool database.

Figure 1:
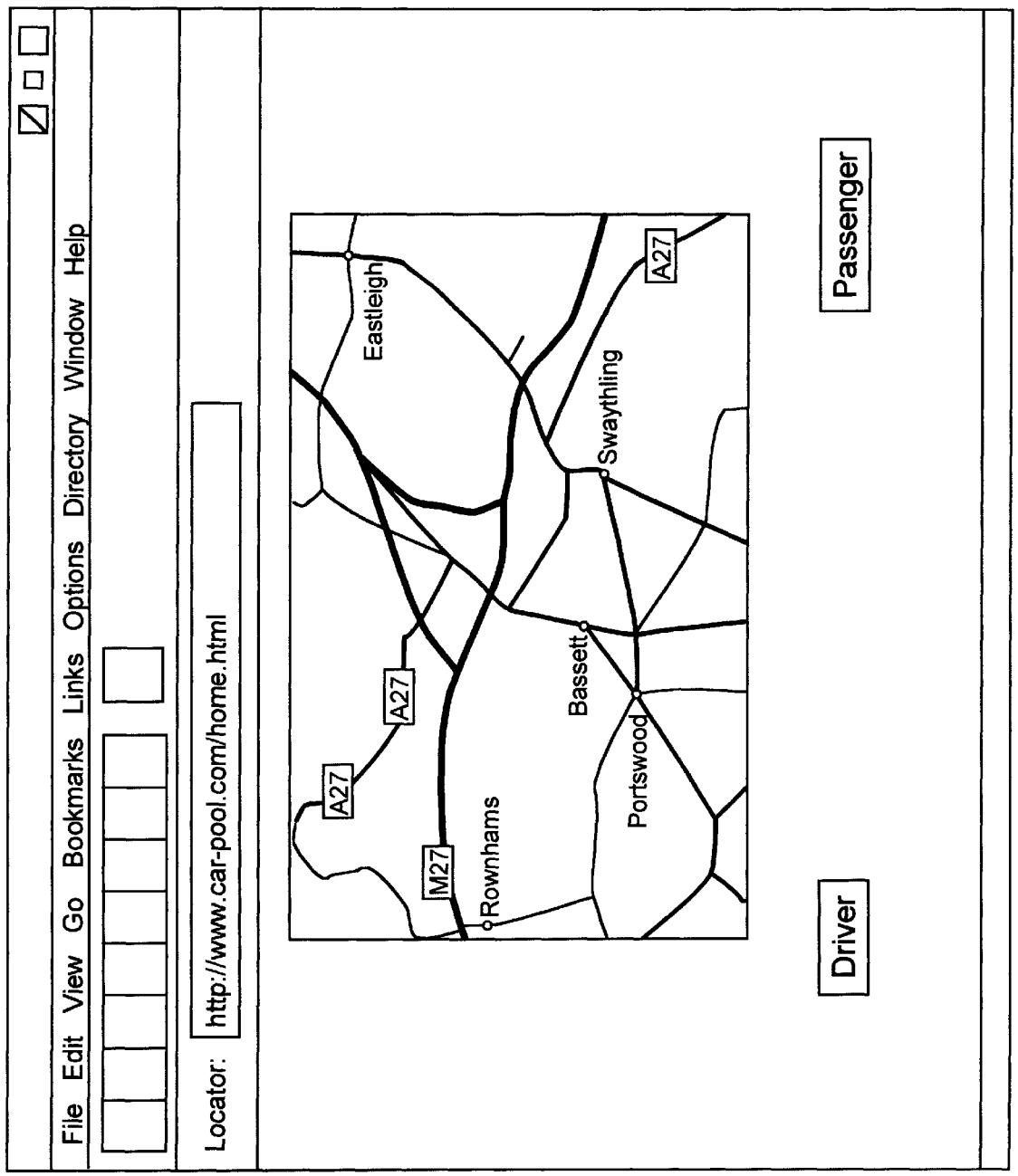
Figure 4:
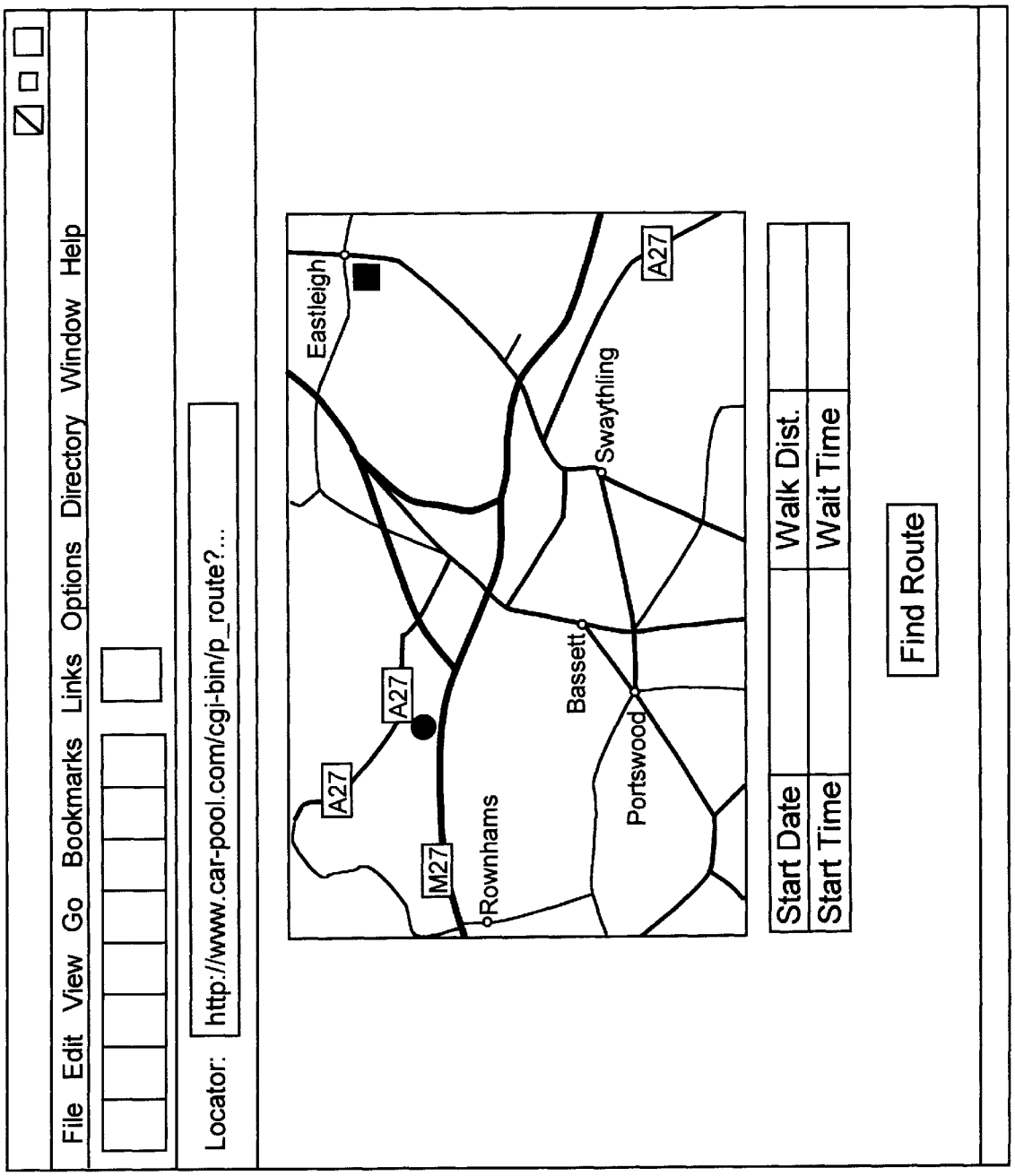

Passengers on the other hand select the "Passenger" button on the home page displaying the required map, FIG. 1, before jumping to a passenger page, FIG. 4. The passenger is then prompted to click on a point on the map to specify a start location for their route. A URL is then generated of the form:

http://www.car-pool.com/cgi-bin/p_route?x_coord&y_coord&session_ID

This launches a p_route program on the server which stores the coordinates as the start location of the journey and replies by returning the map with a superimposed circle indicating the start location. The user is then prompted to click on another point on the map to specify the end location and the process is repeated with p_route returning a map also including a square indicating the end location.

The passenger is then prompted to optionally enter a time/date they will be at their start location on the route; a maximum walking distance; and a maximum wait time. If the time and date are not entered, then all routes entered in the car-pool database will be searched. If maximum walking distance (or "travel to the pick-up point" distance) or wait are not specified, then default values can be used.

The passenger is prompted when satisfied with the entered information to click on the "Find Route" button. This generates a URL causing the p_route program to search the car pool database for previously entered routes.

The searching is preferably done by measuring a distance D between each of the start and end locations specified by the passenger with vectors linking each coordinate in a route specified by the driver with the next. This calculation is based on simple trigonometry taking into account the scale and, where necessary, origin of the map(s) on which the coordinates were plotted.

Figure 7:
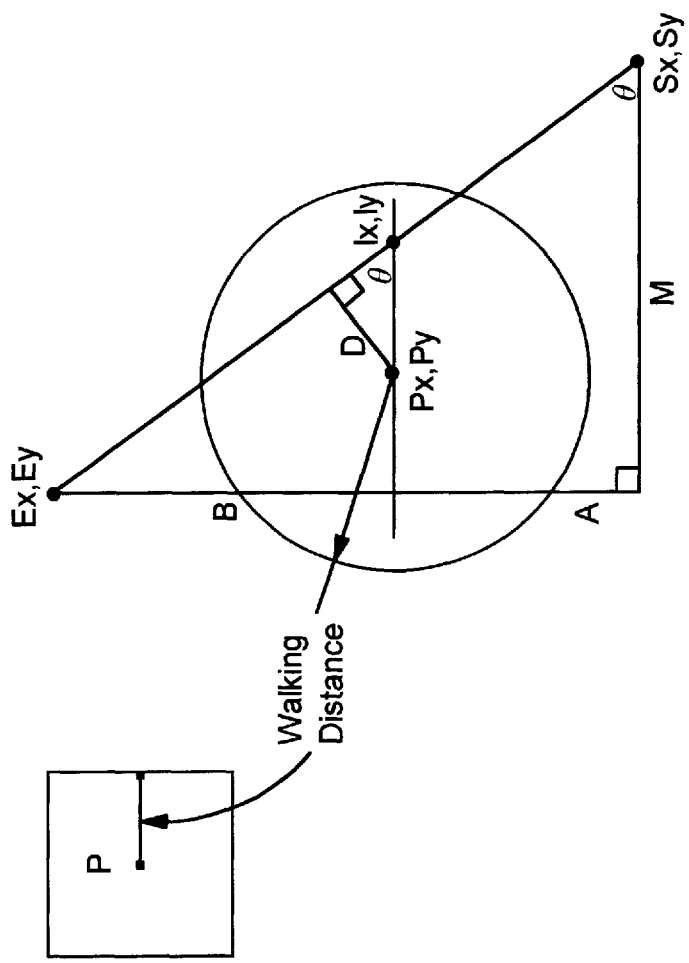
FIGS. 7 and 8 illustrate the algorithms for searching the route database.

FIG. 7 shows an example of such a calculation in more detail. The slope θ of any vector in a route can be calculated from the start and end point coordinates Sx,Sy & Ex,Ey of the vector. The length of a line from the passenger provided coordinate Px,Py parallel to an axis intersecting the vector can be calculated from observing similar triangles, thus $$N = M \cdot (B/(B+A)) \text{ and } Ix = Ex + N \text{ and } D = (Ix - Px) \cdot \cos \theta.$$

Figure 8:
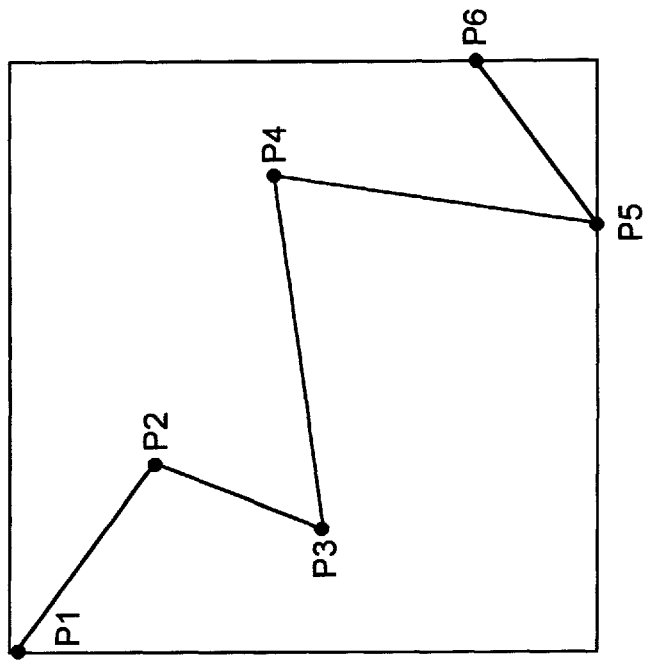

It will be seen, however, that this calculation, which doesn't even include exception checking, if carried out for every vector in the car-pool database may require a large amount of intense calculation and produce unacceptably slow performance. A simple check to avoid many such calculations is to store the maximum and minimum x and y coordinates of any route. In the example of FIG. 8, where a route comprises points P1 . . . P6, these maximum and minimum points bound a box with diagonal vertices P1x, P1y & P6x, P5y. Similarly, by adding and subtracting the walking distance from both passenger start and end points, only one point P is shown, in both x and y directions, respective squares, having a width and height equal to twice the walking distance are defined. If neither of the squares around the passenger points P do not overlap the box bounding a route, then this route will not be suitable and it's individual vectors need not be checked as above.

Nonetheless, if both the start end and end locations specified by the user fall within the specified walking distance of the route; if the driver start time/date for the route is before the passenger start time plus the passenger waiting time less an estimation of the travelling distance for the driver to reach the start location specified by the passenger (to prevent excess passenger waiting); if the driver start time/date and estimated travel time are after the passenger start time (to prevent any driver waiting); and there are enough spaces available in the car for the date specified—the route is deemed suitable. In this regard it should be noted a check should be made to ensure that the route is in the same direction as the locations specified by the passenger before a route is deemed suitable.

Figure 5:
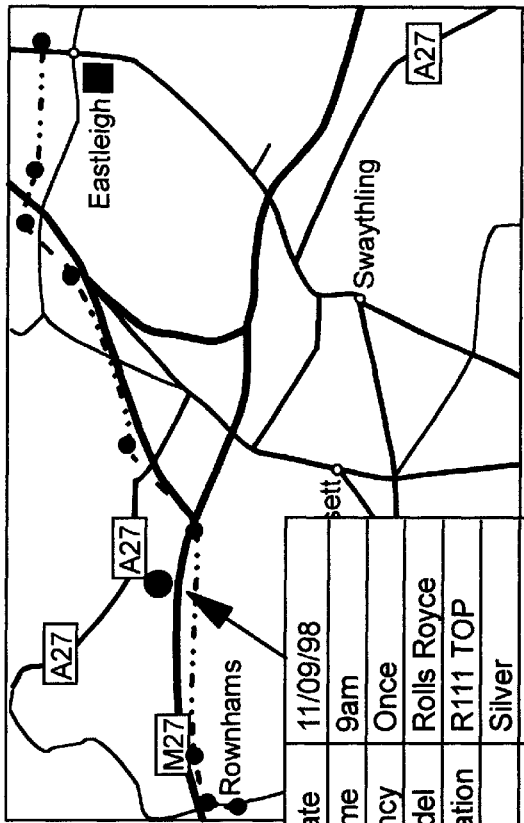

By using the criteria above to eliminate unsuitable routes, a list of suitable routes can be generated and stored temporarily, preferably indexed by the session_ID for the passenger. Preferably, P_route then returns a map on which the suitable routes are overlaid, FIG. 5. The user is prompted to select a route by clicking on the map. Again a URL is generated and the coordinates are compared with those of the suitable routes to determine which has been selected. In this case, the search compares the distance between the selected coordinates and the vectors comprising the suitable routes to find to which route the selected coordinates lie closest.

The details for the closest route are returned and displayed on the navigator screen. The passenger is prompted, if satisfied, to enter their details including their name; their exact proposed pick-up point; and their e-mail address, so that they may be contacted later and to click the "Add Passenger" button. In a commercial system, the user may be asked to provide credit card payment details. To assist in cases of ambiguity, both passengers and/or drivers could be asked to provide their sex which may assist passengers and drivers in accepting proposals for pooling.

This and the fact the driver has provided car registration details also add to the security of the system in that both parties can be sure the other can be identified if anything happens during the journey, and this inherent security provides one of the main advantages over straight-forward hitch hiking, where a driver many never be able to identify a passenger.

Clicking on the "Add Passenger" button generates a URL which calls a program Add_pass on the server and passes the program the list of the passengers details as well as an identifier of the route selected. (This could be the original session_ID for the driver).

If the driver has provided an e-mail address, he can then be automatically contacted with a proposal to pick-up the passenger. If the driver replies acknowledging acceptance of the proposal, then the passenger can be automatically contacted to confirm acceptance of the proposal. This confirmation may even include the driver's e-mail address, enabling the passenger to communicate with the driver directly to sort out further details, if required. It should be seen that in order to prevent fraud by persons who may wish only to gather e-mail addresses, it may be prudent not to send the passenger's e-mail address to the driver, and to let a passenger decide if they wish to communicate via e-mail with a driver, once the driver has accepted their proposal.

A variation of the preferred embodiment takes advantage of the fact that potential passengers provide relatively precise information to the car-pooling system. It is therefore possible for passengers to access the system via telephone connection to a voice-recognition module which is in turn connected to the car-pool database. The module could prompt the passenger to provide start and destination locations which could then be translated to computer readable form and converted to map coordinates. The user could then give the remaining information either orally or by pressing telephone keypad buttons to provide information such as a credit card number, start time/date etc enabling the module to search the database as before. In this embodiment, information about suitable routes would have to be played back to the passenger who could select a route either by pressing a pre-determined keypad button or by replying with a pre-determined word. Acknowledgement of a driver's acceptance of the passenger could be provided by placing a telephone call to the passenger's phone number and playing a pre-recorded or computer generated message.

It will be seen that with widespread use, the present invention could significantly benefit road users. The cost savings to potential travellers could even be off-set against the initial purchase cost of a palmtop computer, sufficient to allow connection to any web sites offering the car-pooling facility or in the second embodiment any telephone costs involved in connecting to the system.

It will be seen that the present invention is both highly scalable and portable. The invention can be added to any organizations web site simply by providing the appropriate maps and adding links from the organization's existing web pages.

It will be seen that because the passenger and drivers routes and start/end locations are only placed over maps, the system does not require maps to be in any particular format. All that is required is that the scale, and the origin of the map in world coordinates should be known and this again makes the invention adaptable for implementation on web sites which may store maps in different formats.

It is not a disadvantage of the invention that the driver is not forced to follow a road accurately when setting out a route, as the walking distance factor provided by a passenger provides enough tolerance to mitigate any undesirable effects of this feature. This can also be seen as an advantage when a driver is specifying routes on a large scale map. Take, for example, a driver specifying a route from London to Glasgow. The driver may not care to divide the route into many sections following each part of the route exactly. A passenger, however, compensates for this lack of accuracy by increasing their "walking" time. Thus, a passenger pooling on a journey of 10 miles may only want to walk 0.25 miles, whereas a passenger looking for a lift of over 500 miles, may be willing to travel 30 miles to make a connection. The exact pick-up point can be negotiated once the driver has accepted the passenger on the basis of the passenger's initially proposed pick-up point.

The invention is further adaptable to enable public transport companies to include their routes on maps. Journeys need not be bookable directly through the car-pooling system, but information could be provided on available public transport timetables where no car-pooling alternative is available. Similarly, tourist companies could use the system to provide tour information or freight companies could use the system to provide delivery route information for persons wishing to send parcels, in this case the parcels are regarded as "passengers".

What is claimed is:

1. A client-server graphic routing system comprising:
   one or more maps
   route defining means instantiable to respond to driver interaction with a map to define a proposed pooling route and to store said pooling route, each proposed pooling route including a series of coordinates corresponding to a driver start, any intermediate and an end locations;
   request defining means instantiable to respond to passenger interaction to define a request for a pooling route, said pooling request including a pair of coordinates corresponding to passenger start and end locations;
   search means instantiable to search stored pooling routes for one or more pooling routes for said request, and including:
      linking means for deriving a series of vectors linking said driver defined pooling route coordinates;
      determining means for calculating the distance of closest approach from said passenger defined locations to said vectors; and
      comparison means for determining that said pooling route is suitable if said distance of closest approach is less than a pre-determined value; and
   addition means responsive to passenger selection of a suitable pooling route to include a passenger on said route.

2. A routing system as claimed in claim 1 wherein said pre-determined distance is a passenger provided maximum walking distance.

3. A routing system as claimed in claim 2 wherein said request defining means is adapted to receive each passenger defined location orally via a telephone line and to convert said oral received locations into map coordinates.

4. A routing system as claimed in claim 1 wherein said proposed pooling routes each include a driver start time, and said pooling request includes a passenger start time, and said search means includes means responsive to said driver start time being after said passenger start time plus a pre-determined waiting time less an estimation of the travelling distance for the driver to reach the passenger start location and said driver time plus said estimation of travelling distance being before said passenger start time to determine a proposed pooling route as unsuitable.

5. A routing system as claimed in claim 1 wherein each proposed pooling route includes a maximum number of spaces available and means for storing the number of passengers included on a route by said addition means, and said search means includes means responsive to the maximum number of spaces available being equal to the number of passengers included to determine a pooling route as unsuitable.

6. A routing system as claimed in claim 1 wherein each pooling route includes a maximum and a minimum coordinate for each map axis, and said searching means includes means responsive to a pre-determined area around each said passenger defined locations not overlapping an area bounded by said maximum and minimum coordinates to determine a pooling route as unsuitable.

7. A routing system as claimed in claim 6 wherein said pre-determined areas extend a passenger provided maximum walking distance along each map axis from each passenger defined location.

8. A routing system as claimed in claim 1 wherein said proposed pooling route includes a driver address, said pooling request includes a passenger name and a proposed pick-up point and said addition means is responsive to passenger selection of a suitable route to forward said pooling request to the driver address for said suitable route, said addition means is further responsive to a positive response from said driver address to include said passenger on said suitable route and to notify said passenger of said inclusion.

9. A routing system as claimed in claim 8 wherein said notification includes said driver address.

10. A routing system as claimed in claim 8 wherein said address is an e-mail address.

11. A routing system as claimed in claim 8 wherein said pooling request includes a passenger address.

12. A routing system as claimed in claim 1 comprising a plurality of maps and map selection means responsive to user interaction to display a portion of at least one of said maps.

13. A routing system as claimed in claim 1 wherein said route defining means is adapted to receive and to superimpose each driver defined location in a pooling route over a map.

14. A routing system as claimed in claim 1 wherein said request defining means is adapted to display a map for a passenger and to receive and superimpose each passenger defined location over said map.

15. A computer program product comprising computer program code stored on a computer readable storage medium for, when executed on a computer, operating a routing system, the product comprising a routing system comprising:

one or more maps route defining means instantiable to respond to driver interaction with a map to define a proposed pooling route and to store said pooling route, each proposed pooling route including a series of coordinates corresponding to a driver start, any intermediate and an end locations;

request defining means instantiable to respond to passenger interaction to define a request for a pooling route, said pooling request including a pair of coordinates corresponding to passenger start and end locations;

search means instantiable to search stored pooling routes for one or more pooling routes for said request, and including linking means for deriving a series of vectors linking said driver defined pooling route coordinates;

determining means for calculating the distance of closest approach from said passenger defined locations to said vectors comparison means for determining that said pooling route is suitable if said distance of closest approach is less than a pre-determined value; and addition means responsive to passenger selection of a suitable pooling route to include a passenger on said route.

16. A Web server including a routing system comprising:

one or more maps route defining means instantiable to respond to driver interaction with a map to define a proposed pooling route and to store said pooling route, each proposed pooling route including a series of coordinates corresponding to a driver start, any intermediate and an end locations;

request defining means instantiable to respond to passenger interaction to define a request for a pooling route, said pooling request including a pair of coordinates corresponding to passenger start and end locations;

search means instantiable to search stored pooling routes for one or more pooling routes for said request, and including:

linking means for deriving a series of vectors linking said driver defined pooling route coordinates;

determining means for calculating the distance of closest approach from said passenger defined locations to said vectors; and comparison means for determining that said pooling route is suitable if said distance of closest approach is less than a pre-determined value; and addition means responsive to passenger selection of a suitable pooling route to include a passenger on said route.

17. In a server computer system including one or more maps, a method of operating a routing system comprising the steps of:

responsive to driver interaction with a map on a client computer system, defining a proposed pooling route and storing said pooling route on said server, each proposed pooling route including a series of coordinates corresponding to a driver start, any intermediate and an end locations;

responsive to passenger interaction, defining a request for a pooling route, said pooling request including a pair of coordinates corresponding to passenger start and end locations;

searching stored pooling routes for one or more routes suitable for said request, comprising the steps of:

deriving a series of vectors linking said driver defined pooling route coordinates;

calculating the distance of closest approach from said passenger defined locations to said vectors; and determining that said pooling route is suitable if said distance of closest approach is less than a pre-determined value; and;

responsive to passenger selection of a suitable pooling route, including a passenger on said route.

* * * * *